The present invention relates to a new and novel method and apparatus for filtering fluids, and more particularly to such apparatus which serves as a dirt remover and water stripper for removing undesirable contaminants particularly in non-water-soluble hydrocarbon fuels and the like.

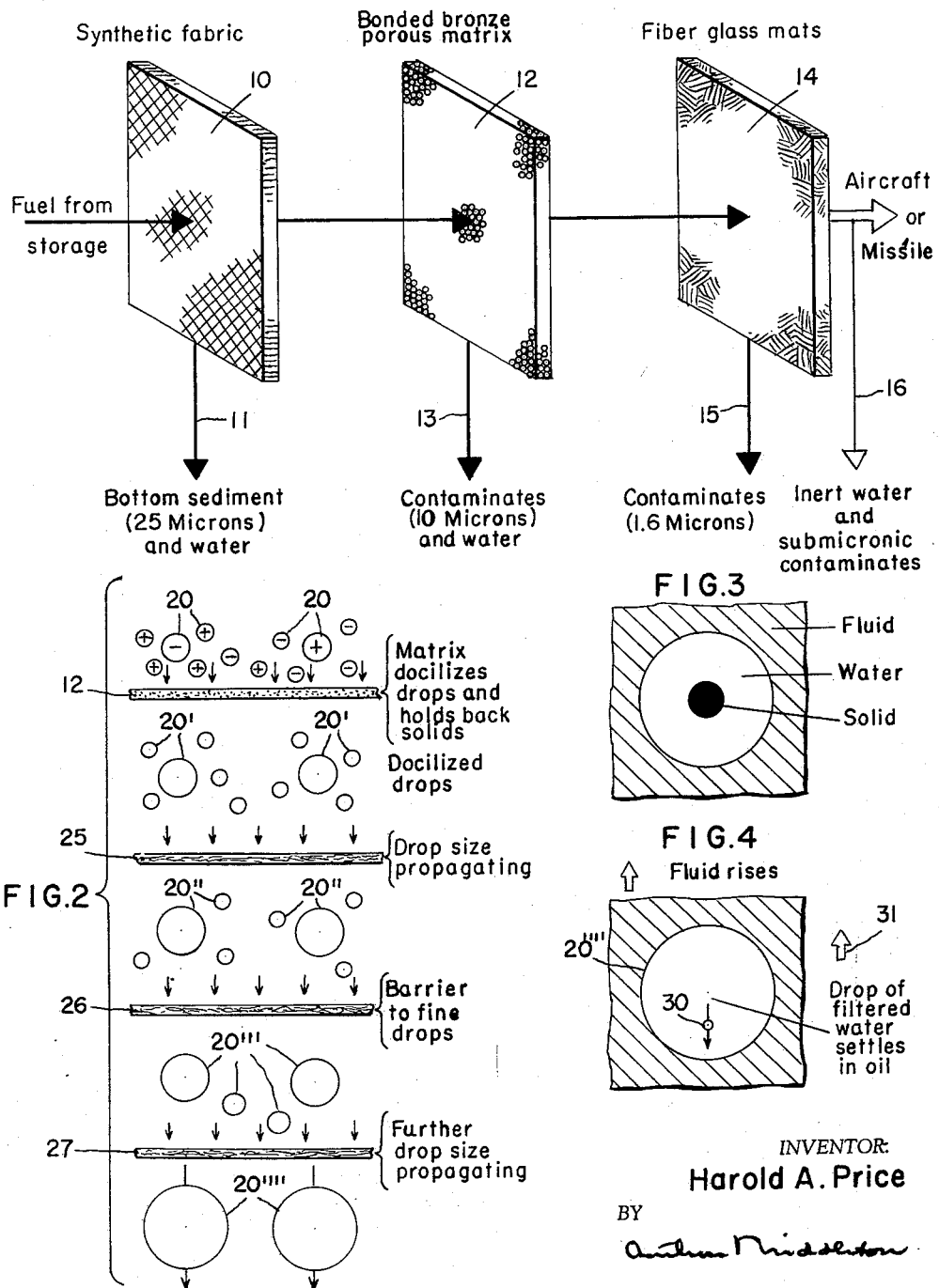

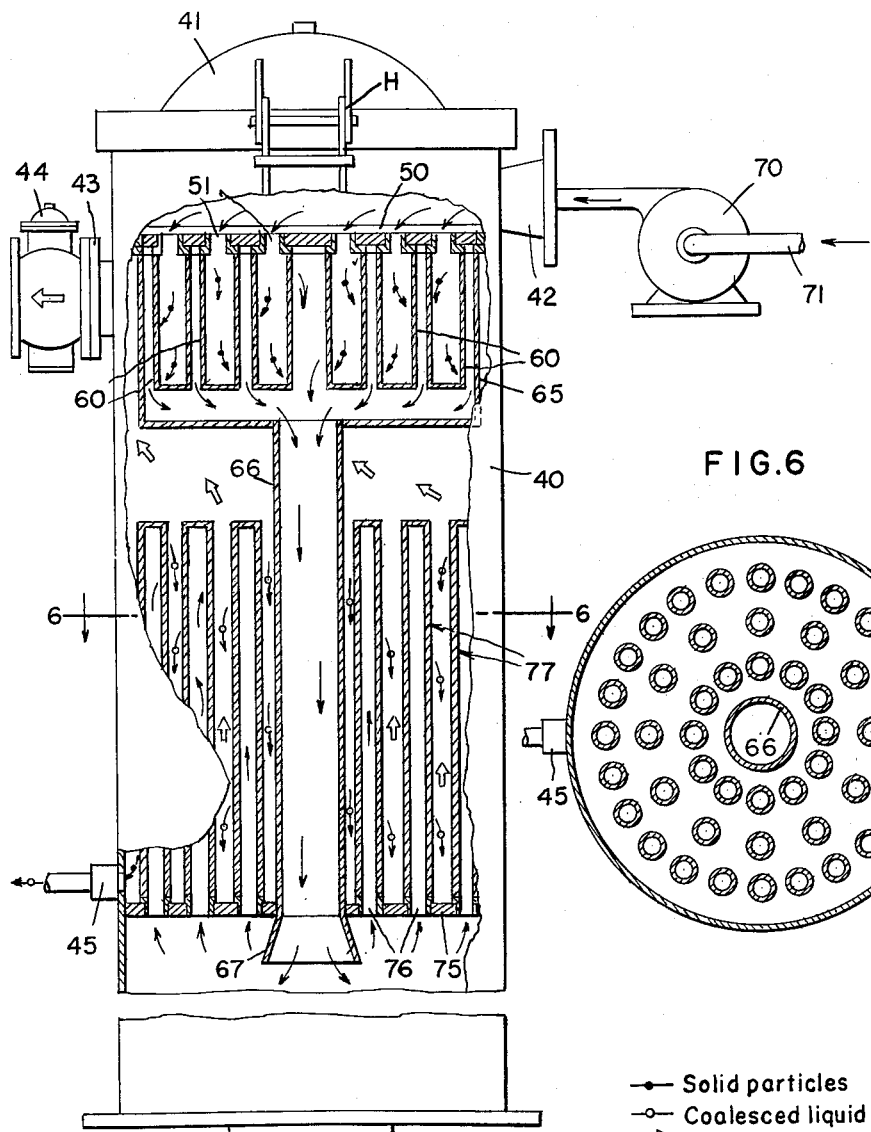
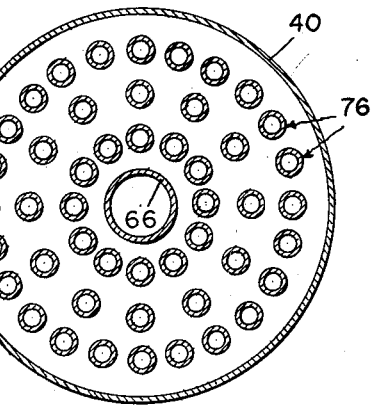
FIG. 5
FIG. 6
→• Solid particles
→○ Coalesced liquid particles
⇨ Filtrate
INVENTOR:
Harold A. Price
BY
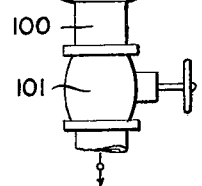
ATTY Jan. 9, 1962     H. A. PRICE     3,016,345
HYDROCARBON FILTRATION
Filed May 14, 1958     3 Sheets-Sheet 3
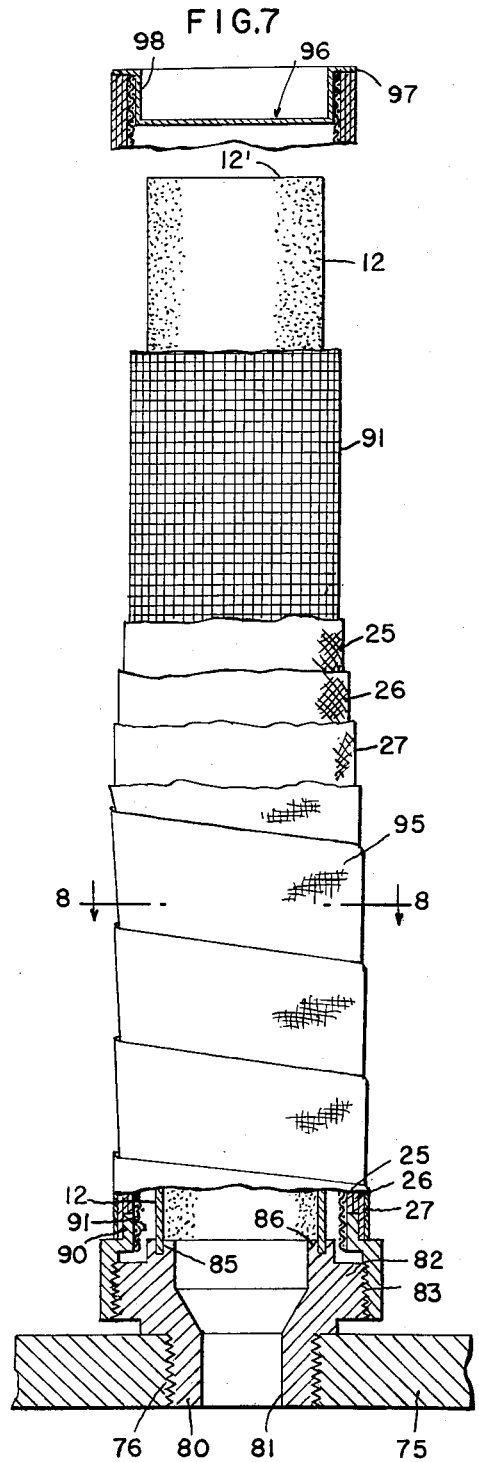
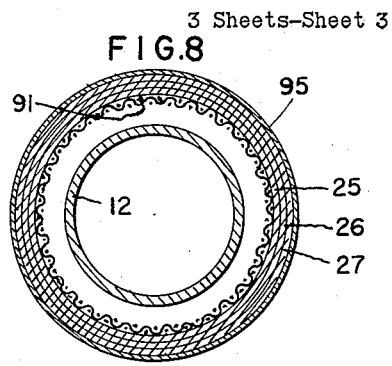
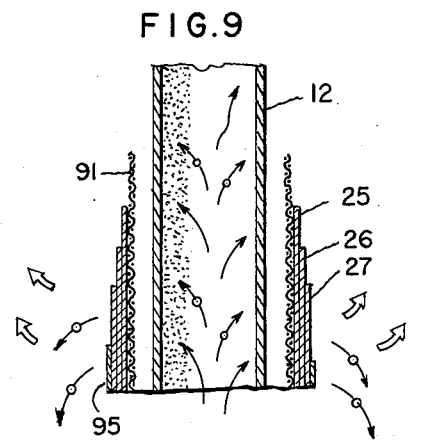
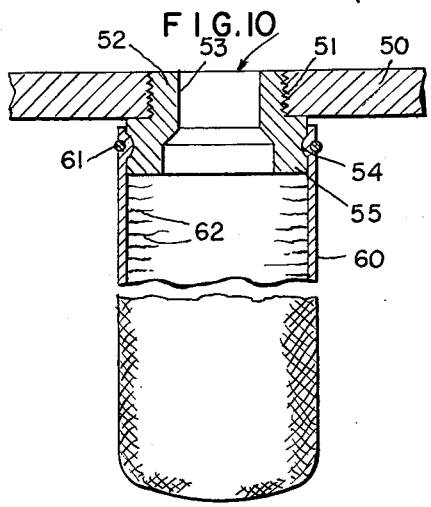
INVENTOR:
Harold A. Price
BY
ATTY 3,016,345
HYDROCARBON FILTRATION
Harold A. Price, Lafayette, Calif., assignor to Permanent Filter Corporation, Los Angeles, Calif., a corporation of California
Filed May 14, 1958, Ser. No. 735,273
12 Claims. (Cl. 208—187)

While the present invention may be employed for removing undesired contaminants from various fluids such as cleaning solvents and paint thinners wherein it is desired to remove wtaer, dirt and waxes or gums in the colloidal state, this invention is particularly adapted for removing contaminants from non-water-soluble hydrocarbon fuels which may be employed, for example, in jet aircraft and missiles. In these applications, the removal of the contaminants is a critical factor, and the present invention is particularly adapted for providing a high degree of removal in order to provide satisfactory operating characteristics for the fuels.

The removal of contaminants from fuels utilized in jet aircraft and missiles has particular significane since, if these contaminants are not adequately removed, serious consequences may result endangering the lives of personnel and causing extensive damage to valuable property. The solid contaminant particles which are usually found in such fuels of course produce undesirable scratching, plugging and generally fouling of various lines and valves employed in the fuel system. In addition, the finely suspended particles of water found in such fuels create a special problem in such applications.

At the high altitudes generally encountered in the operation of jet aircraft and missiles, the lower temperatures cause the suspended, almost colloidal, moisture or particles of water in the fuel to freeze and these tiny frozen particles create a jelly-like emulsion of the fuel and water suspension. This gel clogs or blinds the filters, and will clog up the pumps, lines and fuel injectors and nozzle orifices. Such clogging prevents the fuel from reaching the engine and causes what is commonly known as "flameouts" in jet aircraft. This occurs also in the operation of diesel trucks in very cold weather, but in the case of jet aircraft it is well known that a "flameout" is extremely critical, and if it occurs when power is needed, it, of course, can produce serious consequences and often has resulted in crashes.

In the critical first stage of large missiles, a liquid hydrocarbon fuel is generally used to provide the specific impulse necessary to overcome gravity and inertia. If a contaminant is present in the fuel, it is liable to cause interruption of the fuel flow, and even a momentary interruption of fuel flow and combustion in this stage results in what is commonly known as "burping," which results in the missile settling or toppling off of balance, thereby destroying the efficiency of the firing, and some times resulting in destruction of the missile itself.

The problem of water removal from non-water-soluble hydrocarbon fuels with specific gravities of approximately $7/10$ to $9/10$ that of water as commonly employed in jet and missile fuels has long been recognized and various attempts have been made in the prior art to properly remove contaminants, and particularly to remove the objectionable suspended water particles therein. Various combinations of filtering media have been employed in the prior art which provide adequate operation for removing a substantial portion of the normally detected free and emulsified water from the fuel stream. However in fueling of jets and missiles, the tank is usually "topped off" or brought to its top level by a series of start and stop squirts causing surges in the fuel stream, and such action unfortunately carries contaminants and collected water through the element and downstream into the aircraft or missile storage tank. As a practical matter, this sudden slug of water and contaminant which is forced into the tank is actually worse than no filtering at all since it injects all of the collected moisture into the fuel in one mass. It should be noted also that, although the heavier water normally drops to the bottom of the tank where it can be trapped when in storage for a considerable period of time, the fueling operations churn the water into tiny particles which remain in suspension until the cold temperatures at high altitudes cause it to freeze and form a gelatine-like substance within the fuel.

As a result of the problems created by the presence of tiny suspended particles of water within the fuel, many manufacturers specify that high speed centrifugal pumps should not be used with the fuels which ordinarily creates a gel-type emulsion in heavy distillate fuels. This is due to the electrostatic charges imparted to the moisture particles present in the fuel, and to the turbulence created by the pump which breaks up the larger drops of water into suspended droplets which will pass through ordinary filters or will blind extremely fine coalescers.

The problems involved with respect to the suspension of drops of water in hydrocarbon fuels are compounded by the fact that these heavier jet and missile fuel stocks have a high affinity for water, the fuels actually being hydrophilic to such an extent that they attract moisture from the surrounding air. The problem is further complicated by the fact that refining and blinding of various distillate stocks of different petroleum and different producers cause such a mixing of different characteristics that an even more unstable and non-compatible condition is encountered than would be if a single uniform source of fuel were employed.

The tiny particles of water are held in a suspended state in the fuel and these particles are usually highly electrostatically charged thereby increasing their tendency to stay dispersed due to dissimilar charges which inhibit coalescing. These submicronic particles are small enough to create a fairly stab'e emulsion which must be depeptized in order to promote drop growth or coalescing. A significant point is the fact that in larger globule sizes, the water has a sufficiently greater mass to settle out of the fuel, and it is this characteristic which is employed in accordance with the present invention to eventually remove the desired portion of the water particles from the fuel.

It should be noted that the water which actually dissolves in the fuel at normal temperatures does not pose a great problem by itself, since it is such a small amount but in combination with the finely suspended particles that remain in the fuel after passing through conventional filter separators, the two amounts are great enough cumulatively to cause fuel gel.

When hydrocarbon filtrants such as discussed above have a liquid contaminant, usually water, the liquid is dispersed throughout the fuel in random size drops all the way from visible drops to particles of micronic dimensions such that the mixture can be considered a colloidal suspension which might be said to be peptized or an emulsion having more or less stability. Since even the smallest amount of such contaminants can some times cause failure in a jet or missile engine, it is desirable to remove substantially all or at least a significant portion of the solid and liquid contaminants prior to injection in the engine. In this respect, it should be noted that for practical purposes the method and apparatus will ordinarily be employed according to the present invention prior to inserting the fuel in the tanks of the missile or aircraft, although it is apparent that suitable apparatus may also be mounted within the aircraft or missile itself for removing the contaminants according to the present invention.

In a colloidal state, the water particles have a static charge and resist attraction to conventional filter materials, and although the particles themselves may be larger than the openings in the filter medium, experience has shown that such particles will elongate and pass through the openings without touching the filter medium due to being repelled from the filter material itself. It has been found that a particle of water is often formed around a nucleus of solid foreign matter generally in the form of dirt or a tiny bit of metal or wax. Accordingly, if the water is not removed from the fuel, there is not only the aforedescribed problems in connection with having suspended water drops in the fuel, but in addition the drops of water also carry through the damaging foreign matter into points in the fuel system which have critically close tolerances, thereby obviously producing a danger of excessive friction and fouling of such components.

This invention is based on the discovery that if contaminated hydrocarbon is first passed through a porous rigid hydrophobic matrix having certain characteristics such as of sintered bronze spheres, and then through an adjoining group of self-contacting fiber glass mats or blankets also having certain characteristics, the combination produces new, novel, unexpected and unobvious effects. In one embodiment of the invention, the porous matrix is made into cylindrical form having a closed end and into whose feed end the filtrant is supplied directly under pressure while the matrix is submerged in a bath of filtrate. The mats or blankets of fiber glass are located around the outside of the matrix cylinder and the blankets while closely contacting each other, are preferably out of contact with the matrix although as closely adjacent thereto as it is possible without actual contact.

It should be recalled that there are drops of water in the hydrocarbon of which some are formed around a dirt particle as a nucleus and others are not. Such water drops or droplets or particles often assume or have a charge of static electricity thereon and this seems especially true of the smaller sized particles. Such charges, of the same polarity, repel each other so these must be removed before the water droplets or particles can be coalesced or depeptized. It has been found that the water particles suspended in the fluid in passing through the matrix have their static electrical charges removed or at least neutralized, whereupon the particles or drops become what may be termed docile or charge-free and are thus rendered into coalescible condition.

In passing through the matrix the dirt particles of a size larger or coarser than the pores of the matrix are caught on the interior of the matrix and form a filter cake thereon that can be removed from time to time. Pressure on the feed of filtrant into the matrix tends to squeeze some of the water droplets together whereupon dirt particles previously forming nuclei within the drops are released. The smaller dirt particles pass through the matrix along with the filtrant and also through the space provided between the outside of the matrix and the first of the group of fiber glass blankets.

Since the feed pressure is still on the fuel, it passes through the succeeding contacting layers or blankets of fiber glass and emerges therefrom free of finer dirt particles which are caught on the surface of the blankets to form a filter cake thereon. When the blankets are blinded with filter cake, the blankets are removed as a unit from around the cylindrical matrix and discarded, to be replaced with new ones. Emerging from the fiber glass blankets are the water contaminants of the fuel coalesced into drops large enough to settle in the fuel in which they are suspended so that there is a rising current of clean fuel or filtrate and a descending group of water drops of settleable size. The settling water drops are caught as sediment and removed from the apparatus.

In general, the functioning of the respective blankets of fiber glass is that the first and third blankets are of about the same thickness and both operate to be drop-size propagating or coalescing, while the middle blanket which is thinner has as its function to act as a size-selective barrier to the passage therethrough of the finer drops or those smaller than the selected size. So the inner or first blanket does some coalescing and the outer or third blanket does the final job of coalescing, while the middle or second blanket merely holds back from the outer blanket the finer droplets so they do not escape the inner blanket until they have all been initially coalesced, while coalescing is finished or completed in the outer blanket. So we have here the conjointly cooperative combination of an initial porous rigid hydrophobic filter media that is also a static charge neutralizer and then a group of non-rigid filter media blankets that are drop-size propagating or coalescing.

Additionally, this charge-neutralizing action, or docilizing is found to be facilitated if the hydrocarbon to be treated is first passed through a fabric woven of synthetic fibers such as nylon, Dacron or Orlon, since such fibers appear to have the property of enhancing on increasing the static electrical charges on the droplets. And apparently in proportion as these charges are so enhanced, the docilization of the droplets carrying such charges is more effectively accomplished.

Curiously enough, the results attained by the foregoing combination are greater than the sum of the individual contributions of the basic elements of the combination both as to rate of flow through, and as to percentage of contaminant removal.

During operation of such filter apparatus, the filter elements ordinarily become blind with cake after a certain period of operation. In prior art devices generally employed for this purpose, complete replacement must be made of each of the elements of the filtering apparatus. On the contrary, the present invention is provided with elements which may be removed and washed to remove the cake, and subsequently re-used a number of times. The components of the present invention constructed of synthetic woven fibers such as nylon may be removed and cleaned as well as the porous matrix employed in the invention. The fiber glass elements are generally replaced when they have been blinded. The structure of the present invention is also specifically designed to permit quick and easy insertion and removal of each of these elements when it is desired either to clean them or replace them.

An object of the present invention is the provision of a new and novel method and apparatus for filtering fluids which efficiently removes solid and liquid contaminant particles from the fluid.

Another object of the present invention is to provide a filter apparatus which may be quickly and easily assembled and disassembled.

A still further object of the present invention is to provide a method and apparatus for filtering fluids wherein the fluid is depeptized and the drops of liquid contaminant are coalesced to yield drops of sufficient size to be readily settleable in the surrounding fluid.

A still further object of the present invention is to provide a filtering apparatus which is simple and inexpensive and compact in construction, yet is very reliable and efficient in operation.

Yet another object of the present invention is the provision of a new and novel method for filtering fluids which is completely automatic in operation and which removes substantially all of the solid and liquid contaminants from the fluid.

Other objects and many attendant advantages of the invention will become more apparent when considered in connection with the accompanying specification and drawings wherein:

FIG. 1 is a schematic flow chart illustrating the steps of the method according to the present invention;

FIG. 2 illustrates, in a schematic manner, the docilizing and coalescing action of the filter means;

FIG. 3 illustrates a particle of water having a solid particle nucleus;

FIG. 4 illustrates a resultant coalesced liquid particle after passing through the filter medium;

FIG. 5 illustrates a filter apparatus according to the present invention with a portion broken away to illustrate the details of interior construction thereof;

FIG. 6 is a sectional view taken along line 6—6 of FIG. 5, looking in the direction of the arrows;

FIG. 7 is a view partially broken away of one of the filter units employed in the present invention;

FIG. 8 is a sectional view taken along line 8—8 of FIG. 7, looking in the direction of the arrows;

FIG. 9 is a longitudinal sectional view partially broken away of the unit shown in FIG. 7; and FIG. 10 is an enlarged view partly in section illustrating the manner of mounting the socks in the apparatus.

Before describing the operation of the filtration device or devices of this invention, it may be helpful to mention details of the environment. For instance, it is generally conceded in the industry that hydrocarbons have the following water problems: in the hydrocarbon, there are as contaminants free water and emulsified water with the latter subdivided into light emulsions and stable emulsions. Free water is that normally represented by large free drops or sometimes layers such as found in tank bottoms. Emulsified water is that normally represented by water and oil that has been churned up by such devices as pumps into a liquid comprising very small droplets of water of either water with an oil skin or oil with a water skin, but in either case containing no solids. Light water emulsions or haze is that normally represented by extremely small or fine droplets of water dispersed throughout the hydrocarbon stream and formed by thermal differentials which cause the water that was in solution in the hydrocarbon (rocket fuel having a high solubility of water and jet fuels or other finished hydrocarbons having more receptability for water than gasolines) to be squeezed out upon temperature drop. This haze sometimes will disappear on a slight rise in temperature and will refuse to drop out even on long periods of tankage. Stable emulsions are those drops normally formed upon nuclei of dirt, oxide, or wax particles. These nuclei are quite often in a static charged state, or else the nuclei have a high molecular valence due to temperature variance. The latter may be explained by saying that the valence of an element is that property which is measured by the number of atoms of hydrogen (or its equivalent) one atom of that element can hold in combination if negative, or can displace if positive.

After being so docilized, it has been found that if the hydrocarbon that has passed through the matrix is then passed through the sequence of fiber glass formed as described herein, there is a size-propagating action on the water droplets to make them grow in size until they are thereby made settleable in the hydrocarbon filtrate.

Accordingly, this invention is based upon the discovery that by passing the filtrant through the porous hydrophobic metal matrix, these static charges can be neutralized, and the droplets thereby docilized, probably first by the matrix acting as a capacitor or a constantly recharged condenser, and second, by the molecular valence becoming stabilized by the holding action of the matrix, which slows the flow and thus allowing intimate contact with the metal. The docilizing action is brought about due to the action of the matrix as a semi-conductor due to the contact of the filtrant with exposed areas of the matrix formed of semi-conductor metallic material such as tin or the like. At the same time, due to a slight pressure drop, the expended energy causes a slight drop in temperature and thereby permits a stabilizing effect to take place causing the emulsion to be easily broken up by taking advantage of the positive-negative charge change. Thus the matrix is made use of to accomplish this important effect, but additionally, this invention teaches that there may be used a preliminary conditioning zone through which the hydrocarbon is passed on its way to treatment by the matrix, in which preliminary zone these charges are enhanced. It has been found that if they are so enhanced, the docilizing effect of the matrix seems to be increased. This static charge enhancing zone includes a plurality of sock-like elements through which the hydrocarbon is passed, and these socks are made of fabric woven of synthetic fibers characterized by being of nylon, Dacron, or Orlon. If the fabric is tufted or fibrillated on at least the inside of the sock, the effectiveness is increased over the use of smooth or slick fabric. The sock also acts as a strainer in that it holds back some of the larger dirt solids in the hydrocarbon filtrant from reaching the matrix.

A furtherword now about the matrix. The most effective matrix seems to be one formed of sintered bronze spheres. The spheres were made of copper—about 90%—and about 10% tin coating the spheres. These are sintered into a hard cylinder whose staple is axial while its flow-through is approximately 90°. The matrix is approximately from 1/8 inch thick to 3/16 inch thick, but the increased pressure drop of the thicker matrix limits the thickness to be used. The average void space is about 40% of the area. The pores or passages through the matrix can lie in a range of from 10 microns to 40 microns, depending on the character of the filtrant, but a range of from 20 microns to 30 microns seems to be the best. Sometimes the matrix will tend to become blinded and its capacity will thus drop off, so under such conditions it has proved satisfactory to add as much as 5% water to the filtrant since this seems to obviate what otherwise would be serious blinding. The added water seems to inject no serious problem because as it passes through the fiber glass blankets, their drop-size propagating power seems to condition the water easily to give it good settleability characteristics. The flow-through the matrix can be handled dependably at a rate of 5 gallons per minute per square foot of matrix area. Curiously, enough tests have shown that flow-through of the same filtrant through the same matrix without the fiber glass blankets is about .6 gallon per minute and flow-through the fiber glass blankets without the matrix is about 2 gallons per minute, yet with the combination of the same two elements, the flow-through will increase to 5 gallons per minute.

Referring now to the drawings wherein like reference characters designate corresponding parts throughout the several views, there is shown in FIG. 1 a flow diagram illustrating the general theory and method according to the present invention. The fuel from a suitable storage tank is forced through a first filter medium indicated by reference numeral 10 formed of a woven synthetic fabric such as nylon preferably having tufts thereon. This fabric will be woven of such a mesh that particles larger than 25 microns will be prevented from passing therethrough such that solid particles and water particles of a size greater than this will settle to the bottom of the apparatus as indicated by arrows 11. It should be noted that as the particles of water pass through filter element 10, the electrostatic charge thereon is enhanced or increased.

The fluid filtrant then is caused to flow through a second filter medium indicated by reference numeral 12 in the form of a rigid porous matrix as previously mentioned, the passages in the matrix being such as to prevent particles greater than 10 microns in size from passing therethrough. Accordingly, solid or liquid contaminants are separated from the fluid and will either cake upon the wall of filter element 12 or will settle to the bottom of the apparatus as indicated by arrow 13. It should be noted that as the liquid particles pass through filter element 12, they are docilized as described above.

The fluid is subsequently forced through a third filter medium indicated by reference numeral 14 and comprising a mat assembly composed of a plurality of layers of fiber glass disposed in contact with one another. Preferably three layers of fiber glass are employed, although various other numbers of layers may be employed in accordance with the degree of coalescing required. The layers of fiber glass of the mat assembly are composed of unbonded fibers of such a size and disposition as to prevent solid contaminants of a size greater than substantially 1.6 microns and large drops of liquid from passing therethrough. The large water drops and solid contaminants which are blocked by the mat assembly will form a cake or settle out downwardly in the apparatus as indicated by arrow 15.

The mat assembly 14 not only prevents certain size contaminants from passing therethrough, but serves the additional purpose of coalescing or causing water drop propagation as the filtrant passes therethrough. As a result, after the fluid has passed through filter element 14, a significant portion of the suspended water particles has been coalesced into large water drops which will separate or settle downwardly by gravity as the filtered fluid itself moves upwardly such that the filtered fluid is caused to flow to the aircraft or missile engine while the inert water and the submicronic solid particles nucleii therein are removed from the apparatus as indicated by arrow 16.

At this point, a further description of the rigid porous matrix is deemed advisable in order to point out the mode of construction in more detail to illustrate the variations which may be made therein in accordance with the desired filtering. The matrix is formed of tin-coated copper spheres or other suitable material which are put in a mold to provide the desired size and shape of the matrix, and the matrix is then sintered in a tunnel kiln or the like. Where the matrix is to be used for holding back say 98% of all particles 10 microns in size and larger, the matrix can be made up of sintered bronze spheres. The spheres can be sized as follows: 2% maximum having a diameter of plus 60 screen mesh; 55–85% plus 80 screen mesh; 10–35% plus 100 screen mesh; and 10% maximum plus 150 screen mesh with the starting spheres being about 90% copper with a tin coating of about 10%. If the matrix is for holding back, say 98% of all particles 20 microns in size or above, the matrix can be made up on such spheres of about 95% copper with a coating of about 5% tin, and the spheres used can be 1% maximum of plus 40 screen mesh, 98% minimum of plus 50 screen mesh; and 1% maximum of plus 60 screen mesh. If the matrix is for holding back say 98% of all particles 40 microns or larger, there should be used 3% maximum of plus 30 mesh; 95% minimum of 40 screen mesh; and 3% maximum of plus 50 screen mesh. The "plus" in the foregoing designates particles that will remain on the given sieve size.

The construction of the mat assembly will now also be described in more detail. As disclosed herein, the mat assembly comprises three separate blankets, the inner or upstream blanket which is first traversed by the filtrant serving to prevent passage therethrough of larger particles while allowing water droplets in suspension to pass therethrough and while so passing being coalesced or having their drop size enlarged. The intermediate blanket downstream from the aforementioned blanket serves as a barrier to the passage therethrough of water drops smaller than a predetermined size. The third or downstream blanket is a second drop size propagating blanket similar to the first mentioned blanket. These blankets or layers are each preferably formed of fiber glass* wool which are unbonded, and the fibers thereof have provided satisfactory results when of the following characteristics: The inner or upstream and the outer or downstream blankets are constructed of unbonded "B" fibers having an average diameter of .00010 to .00015 inch. The intermediate blanket is constructed of unbonded "A" fibers having an average diameter of .00003 to .00004 inch. The amounts of fiber glass used in the inner or upstream, the intermediate and the outer or downstream mats are respectively 14 grams+10%, 15 grams+10% and 16 grams+10%.

When the blankets are constructed as above and disposed in adjacent contacting relationship with one another, the mat assembly, when compressed under normal filter flow conditions, has a thickness of from approximately 1/16" to 3/32". The space between the porous matrix and the mat assembly has proved to operate quite satisfactorily when spaced between 1/16" to 1/2" therefrom.

Referring now to FIG. 2 of the drawings, the manner of docilizing and coalescing action of the apparatus is schematically illustrated. As seen in the uppermost illustration in FIG. 2, the liquid drops 20 approaching the filter element 12 are of different sizes and are provided with electrostatic charges of different polarity. As the water drops pass through the porous matrix, the larger drops and particles are held back and the electrostatic charges are effectively neutralized.

The next stage of FIG. 2 illustrates the uncharged particles 20' approaching the first or upstream blanket or layer 25 of mat assembly 14. As the water drops pass through layer 25, some of the smaller water drops are forced to coalesce or unite with various other water drops to provide larger water drops as they emerge from the layer. The coalesced water drops 20" then pass through the second or intermediate blanket or layer 26 of mat assembly 14 which as previously mentioned is constructed of fibers of smaller diameter than those of layer 25 and serves as a barrier to the fine drops. The drops 20''' emerging from layer 26 then are forced through the third or downstream layer or blanket 27 of mat assembly 14 which serves as a further drop size propagating medium such that water drops 20'''' which finally emerge from the mat assembly are large, smooth depeptized water drops which will separate out from the surrounding filtrate due to the force of gravity.

FIG. 3 illustrates the manner in which the water and solid particles are often suspended in the fluid, the solid contaminant particles serving as a nucleus for the surrounding drop of liquid contaminant. FIG. 4 illustrates the manner in which a completely coalesced and treated drop of liquid 20'''' settles downwardly as illustrated by arrow 30 as the filtrate rises upwardly as indicated by arrow 31.

Referring now to FIGS. 5 and 6 of the drawings, the apparatus of the present invention is illustrated and comprises an elongated hollow tank 40 having an enclosed chamber therein and a domed top member 41 hingedly connected thereto. An inlet means 42 is provided for introducing filtrant into the device and an outlet means 43 in the form of a conduit having a suitable diaphragm operated valve 44 therein is in communication with the interior of the tank for exhausting the filtrate therefrom. A second outlet means 45 in the form of a conduit is connected at a lower portion of the tank for withdrawing contaminants from the tank.

A first partition 50 extends laterally across from wall to wall inside the tank and has a plurality of openings 51 formed therein. As seen most clearly in FIG. 10 of the drawings, a fitting 52 is threaded within suitable threads provided in each of openings 51, fitting 52 having a bore 53 therethrough and having a circumferential groove 54 formed in the outer surface of the lower annular flange 55 thereof. A hollow sock 60 formed of woven synthetic fabric as previously described surrounds flange 55 and is \* Fiber glass manufactured by Owens-Corning Glass Co.

secured tightly thereto by a resilient annular sealing ring 61. A plurality of inwardly extending tufts 62 are provided on the inner surface of sock 60 for enhancing the electrostatic charge on the water particles and for collecting sludge thereon. It is apparent that fitting 52 can be quickly and easily removed from partition member 50, and that the sock member 60 may be easily slid on and off of flange 55 of fitting 52 whereby the socks may be easily removed for cleaning and subsequently replaced in the apparatus. Referring again to FIG. 5, it is seen that a plurality of socks are suspended from partition 50, and the socks are enclosed by a substantially cup-shaped hollow member 65, the upper portion of which contacts partition 50 to provide a seal therewith. Cup-shaped member 65 has an integral downwardly extending elongated conduit 66, the lower flared end 67 of which opens into the bottom portion of the tank. In this manner, it is apparent that fluid which is pumped through inlet means 42 by a pump 70 drawing filtrant through a conduit 71 from a suitable storage means (not shown) will pass into the upper portion of the tank and downwardly through openings 51 and socks 60 and thence downwardly through conduit 66 into the lower portion of the tank. Pump 70 may be operated at any desired pressure, but in ordinary applications it has been found that a pump pressure somewhere in the range of 15 to 125 p.s.i. is satisfactory. The internal pressure drop through the apparatus will ordinarily range from less than 5 p.s.i. when the apparatus is clean to approximately 30 p.s.i. when the apparatus is dirty and the various filter elements have a cake thereon.

A second partition 75 is mounted in the lower portion of the tank in surrounding relationship to conduit 66 and extends outwardly into engagement with the inner walls of the tank. Partition 75 is provided with a plurality of openings 76 therein, each of which supports a filtering unit indicated generally by reference numeral 77. As seen most clearly in FIG. 7 of the drawings, a fitting 80 is threadedly mounted on each of threaded openings 76 and has a central bore 81 extending therethrough. The upwardly extending flange 82 of fitting 80 is provided with threads on the exterior thereof, and a substantially annular collar 83 is threaded thereon.

An annular groove 85 is recessed into the upper surface 86 of fitting 80 and the porous matrix 12 which is of cylindrical configuration has the lower end thereof securely clamped within the groove. Matrix 12 extends upwardly and has a closed upper end 12′ whereby it is apparent that fluid entering through bore 81 of fitting 80 will pass upwardly within the matrix and thence outwardly through the porous walls thereof.

Collar 83 has an upwardly extending annular flange 90 which supports inwardly thereof a substantially cylindrical screen member 91 which provides an inner rigid support for the mat assembly according to the present invention. The three layers 25, 26 and 27 of the mat assembly are supported by screen 91 and extend upwardly in cylindrical concentric relationship with the matrix 12. A strip of glass cloth 95 of open-weave is wrapped around the outer surface of layer 27 of the mat assembly for maintaining the mat assembly in proper position about screen 91, and yet is highly permeable by the filtrant. As shown at the upper portion of FIG. 7 of the drawings, a cap 96 having an annular flange 97 is provided for maintaining the upper ends of the screen and layers of the mat assembly in proper spaced relationship with respect to one another by means of a downwardly projecting annular wall 98 defining a recess in the center thereof. It is apparent that the entire unit shown in FIG. 7 including fitting 80 may be unscrewed from partition 75 and removed bodily from the apparatus, thereby enabling a new unit to be quickly inserted in place thereof. It is further apparent that collar 83 and the supported mat assembly may be in turn separately removed from fitting 81 whereby a new mat assembly may be inserted on fitting 80 to cooperate with the matrix supported thereby. Of course, the matrix itself may also be removed from fitting 80 and a new one inserted in place thereof. In this manner, a very flexible unit is provided whereby the various components thereof may be quickly and easily assembled and disassembled for cleaning or replacement, and yet the unit itself is very compact and sturdy in construction.

Referring again to FIG. 5, it should be noted that as the filtrant passes downwardly into the lower portion of the tank through flared portion 67 and conduit 66, it is still under pressure and accordingly is forced upwardly within each of the filtering units 76 and then outwardly through the matrix thereof. The filtrant will then be forced through the mat assembly whereupon the water particles are coalesced into relatively large docilized drops. These large inert drops of liquid will move downwardly under the influence of gravity between filter units 76 and will pass outwardly through an outlet 45. The filtrate will rise upwardly within the tank and pass outwardly through outlet 43. An additional outlet 100 having a control valve 101 therein is mounted in the lower portion of the tank for exhausting any heavy matter or contaminants which may settle to the bottom of the tank. The filtrant flow through the apparatus as indicated by the arrows in FIGS. 4, 5 and 9 clearly illustrates the manner in which the contaminants are separated out of the filtrant according to the present invention, and the significance of the various arrows is set forth in a suitable legend inserted just to the right of the lower portion of FIG. 5 of the drawings.

It is apparent from the foregoing that there is provided a new and novel method and apparatus for filtering fluids wherein substantially all the solid and liquid contaminants are efficiently and expeditiously removed from the fluid.

It is apparent that the invention may also be used for removing contaminants from other substances than hydrocarbon fuels, although this is a particularly advantageous application of the present invention. Both solid and liquid particles are efficiently removed by the present invention, and the apparatus may be quickly and easily assembled or disassembled in order to clean the various components thereof. In this connection, the strainer socks employed in the present invention may be removed and cleaned about five or six times before requiring replacement. The porous matrix employed in the present invention may also be cleaned and will last for an extended period of time. The fiber glass mat assembly must be replaced periodically when it is blinded.

The apparatus according to the present invention is extremely simple and inexpensive in construction and provides a very compact arrangement which is quite reliable and efficient in operation. The method according to the present invention is entirely automatic in operation, and also removes substantially all of the solid and liquid contaminants from the fluid. The present invention operates in accordance with novel principles not heretofore employed in the art, and represents a major breakthrough in the filtration of non-water-soluble hydrocarbon fuels and the like.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A method of removing contaminants including water particles from a hydrocarbon liquid which comprises separating out solid material contaminants and increasing the static electrical charges on the water particles, then substantially neutralizing the electrical charges on the water particles, subsequently coalescing the water particles to propagate the size thereof, and finally separating out the particles of water from the hydrocarbon liquid.

2. A method of removing contaminants including solid and water particles from a hydrocarbon liquid which comprises passing the hydrocarbon liquid through a first dirt catching filter medium for removing solid particles and increasing the static electrical charges on the water particles, then passing the liquid through a porous means and substantially neutralizing the electrical charges on the water particles, subsequently passing the hydrocarbon liquid through a coalescing means for coalescing the water particles to provide relatively large heavy drops thereof, and finally separating out the large heavy drops of water from the filtrate.

3. A unit for water and dirt contaminated hydrocarbon filtration and de-watering apparatus of the class described, which comprises in combination a hollow closed-end cylindrical porous rigid hydrophobic matrix for neutralizing static charges on water drops suspended in the hydrocarbon passing therethrough, said matrix having spaced areas of semi-conductor material, means for feeding such hydrocarbon as filtrant into the cylindrical matrix under pressure, and a plurality of contacting filter-media blankets of fiber glass encircling the matrix wherein the inner and outer blankets are water drop-size propagating while the middle blanket forms a size-selective barrier to the passage therethrough of water drops smaller than the selected size.

4. The unit according to claim 3, wherein the matrix is made of sintered bronze spheres.

5. The unit according to claim 3, with the addition of a plurality of socks through which the hydrocarbon is passed before it encounters the matrix, which socks are of fabric woven from synthetic fibers having the property of enhancing the static charges carried by water particles passing through the socks.

6. A combined filter and de-waterer for hydrocarbon contaminated with particles of water and of dirt, which comprises an enclosed casing having a first perforated partition thereacross forming a chamber thereabove and another therebelow, a combination filtration and coalescing unit mounted alignedly with each perforation of the partition, means for conducting filtrate from the chamber above the partition, means for feeding filtrant to the chamber below the partition under sufficient force to flow the filtrate through the filter units, and means associated with the bottom section of the chamber below the partition for removing water settling as sediment thereinto, wherein said units each comprise in combination a hollow closed-end cylindrical porous hydrophobic matrix for neutralizing static charges on water drops suspended in the filtrant passing therethrough, and a plurality of contacting filter-media blankets of fiber glass encircling the matrix wherein the inner and outer blankets are water drop-size propagating while the middle blanket forms a size-selective barrier to the passage therethrough of water drops smaller than the selected size.

7. Apparatus according to claim 6, with the addition of a second perforated partition across the casing above the first partition, a sock depending from the second partition aligned with each perforation therein with such sock formed of fabric woven from synthetic fibers.

8. Apparatus according to claim 7, wherein the fabric of the socks is tufted on the inside of the sock.

9. Apparatus for filtering liquids and removing solid particles and water particles therefrom which comprises a body means having a closed cavity therein, inlet means in communication with said cavity for introducing filtrant into the cavity, outlet means in communication with the cavity for exhausting filtrate from the cavity, means for forcing a liquid under pressure through said inlet means and through said cavity and out through said outlet means, first hollow thin walled filter means of woven fiber opening toward the liquid stream flow such that fluid enters into the interior of said first filter means, second hollow filter means disposed downstream of said first filter means and opening toward the direction of liquid flow such that the fluid enters within said second hollow filter means, said second filter means comprising a porous rigid hollow matrix formed of bonded metallic spheres having exposed areas of semi-conductor material and surrounded by a mat assembly including a plurality of layers of fiber glass, said layers of fiber glass being in contact with one another and being spaced from said matrix.

10. Apparatus as defined in claim 9 including a plurality of tufts formed on the inner surface of the first hollow filter means.

11. Apparatus for removing contaminants from fluids which comprises a hollow porous matrix formed of sintered bronze spheres being closed at one end and open at the other end for receiving fluids therein, a mat assembly spaced from and disposed in surrounding relationship to said matrix, a substantially rigid screen means disposed between said matrix and said mat assembly for supporting said mat assembly in proper operative position, and an open-weave cloth material disposed in surrounding relationship to said mat assembly and in contact therewith for maintaining the mat assembly in proper relationship to said screen means.

12. Apparatus for removing contaminants from liquids including a hollow porous matrix formed of sintered non-porous spheres and being closed at one end and open at the other end for receiving liquids therein so that the liquid is adapted to pass through the matrix, and a mat assembly spaced from and disposed in surrounding relationship to said matrix, said mat assembly including a plurality of layers of material, each of said layers being formed of fibers, and an intermediate layer of said layers being formed of fibers having a smaller average diameter than the average diameter of the fibers of the layers on either side thereof.

References Cited in the file of this patent

UNITED STATES PATENTS

| | | |
|---|---|---|
| 1,787,577 | Hills | Jan. 6, 1931 |
| 2,057,219 | Vokes | Oct. 13, 1936 |
| 2,312,091 | Gray | Feb. 23, 1943 |
| 2,359,386 | Reinsch | Oct. 3, 1944 |
| 2,430,078 | Reinsch et al. | Nov. 14, 1947 |
| 2,562,730 | Miller | July 31, 1951 |
| 2,609,932 | Fricke | Sept. 9, 1952 |
| 2,626,709 | Krieble | Jan. 27, 1953 |
| 2,657,808 | Mankin | Nov. 3, 1953 |
| 2,701,062 | Robinson | Feb. 1, 1955 |
| 2,781,909 | Thompson | Feb. 19, 1957 |
| 2,792,943 | Mackintosh | May 21, 1957 |
| 2,800,232 | Marvel | July 23, 1957 |
| 2,837,214 | Kasten | June 3, 1958 |

Disclaimer

3,016,345.—*Harold A. Price*, Lafayette, Calif. HYDROCARBON FILTRATION. Patent dated Jan. 9, 1962. Disclaimer filed Apr. 18, 1975, by the assignee, *Permanent Filter Corporation*.

Hereby disclaims the entire remaining term of said patent.

[*Official Gazette September 2, 1975.*]